10

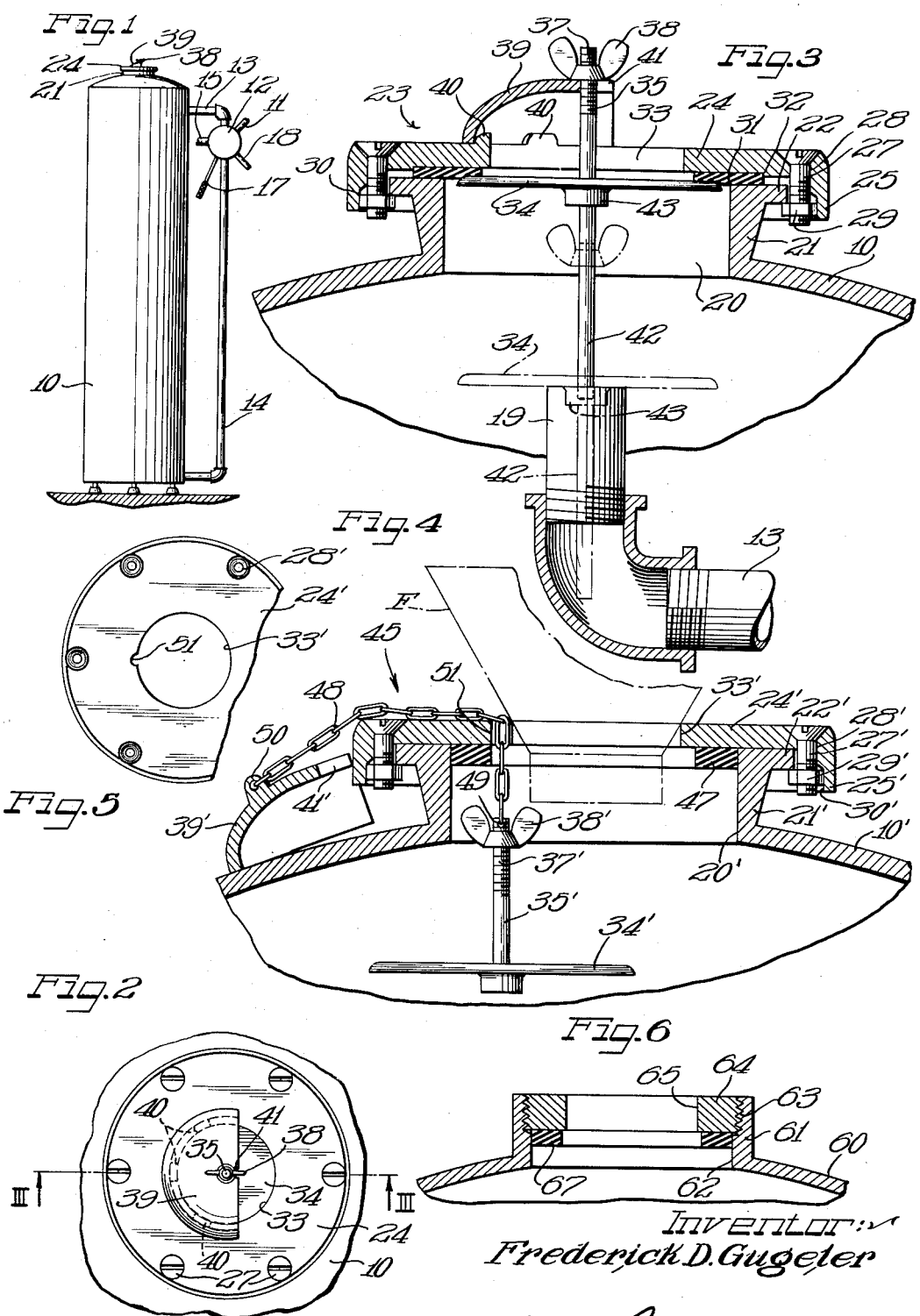

United States Patent Office 2,729,359
Patented Jan. 3, 1956

2,729,359

WATER PRESSURE SEALING CLOSURE FOR WATER SOFTENER TANKS

Frederick D. Gugeler, Lombard, Ill.

Application November 7, 1951, Serial No. 255,202

11 Claims. (Cl. 220—25)

The present invention relates to improvements in tank closures and is particularly concerned with a tank closure which is self-sealing responsive to internal pressure within the tank and is especially suitable for use with water softener tanks for domestic and industrial uses.

For water softening purposes an upright tank having therein a bed of a softening agent such as zeolite, or the like, is installed in the water supply line so that hard water must flow through the bed of softening agent which removes the mineral matter that renders the water hard, and the water that is drawn off from the tank is soft. However, from time to time it is necessary to regenerate the softening agent by introducing salt into the tank. For this purpose the tank must be opened and it has been customary to provide the top of the tank with a readily openable closure. Conventionally such closure has been in the form of a yoke clamp engageable with a flanged neck on the top of the tank.

Since the yoke clamp cover operates on the principle of pressing a lid or cover plate against a gasket on top of the tank opening neck, leakage from pressure within the tank past the cover will occur if the screw has not been thoroughly tightened in the yoke clamp, or if the gasket becomes worn or is not properly seated. Wearing of the gasket is a common experience due to the tendency to over-tighten the cover as a safeguard against leakage. There is also a tendency of the yoke and screw mechanism of the cover to become corroded and difficult to operate.

According to the present invention, an improved, simplified and efficient self-sealing closure is provided which responds to internal pressure of the water in the tank to effect a thorough seal against leakage through the opening in the tank, and avoiding the cumbersome and corrosion-susceptible prior mechanism customarily used on water softeners.

An important object of the present invention is to provide a new and improved self-sealing tank closure device.

A further object of the invention is to provide a water softener tank charge opening closure which is especially adapted to be made at low cost from highly corrosion-resistant materials and parts and which is simple and easy to operate.

Another object of the invention is to provide an improved water softener tank closure device which during charging of the tank with salt for regeneration purposes, assists in effecting more or less uniform distribution of the salt charge within the tank over the bed of softening agent within the tank.

Still another object of the invention is to provide a closure device especially adapted for water softener tanks that may be supplied either as original equipment or as replacement equipment on existing tanks.

Other objects, features and advantages of the present invention will be readily apparent from the following detailed description of certain preferred embodiments thereof taken in conjunction with the accompanying drawings, in which:

Figure 1 is a front elevational view of a water softener tank installation utilizing the features of the present invention;

Figure 2 is an enlarged fragmentary top plan view of the tank and closure of Fig. 1;

Figure 3 is an enlarged fragmentary sectional detail view taken substantially on line III—III of Fig. 2;

Figure 4 is a fragmentary vertical sectional view of the top portion of a water softener tank similar to Fig. 3 but showing a modified form of the closure;

Figure 5 is a top plan view of the closure adapter plate of Fig. 4; and

Figure 6 is a vertical diametrical sectional view through the access opening neck portion of a tank showing a modified form of closure disk seat.

Referring to Fig. 1, a water softener tank 10 is customarily of elongated upright form providing in the lower portion thereof substantial space for a preferred volume of a suitable discrete softening agent while the upper portion of the tank serves as a reservoir either for hard or unsoftened water to percolate through the bed in response to utility demands where a down-flow system is used, or for soft water where an up-flow system is used.

In Figs. 1, 2 and 3 the invention is disclosed as applied to a water softening system of the down-flow type wherein, for example, water from a suitable source such as a city main is supplied through a pipe 11 to a control valve 12 to be diverted by way of a duct 13 into the upper portion of the tank 10. Soft water is drawn off from the bottom of the tank through a duct 14 and is diverted by the control valve 12 into a utility duct 15. The valve 12 is provided with means such as a handle 17 by which it can be operated to close the supply line 11 and drain the tank by way of a drain duct 18, or to flush the tank after regeneration, and during which time the delivery duct 15 will be closed off.

Within the tank, the duct 13 has an upwardly directed influent nipple 19 adjacent to the top of the tank and coaxial with the tank so that inflowing water will distribute substantially uniformly within the tank and without setting up undesirable eddy currents.

Above the coaxial with the inlet nipple 19, the tank 10 has an access opening 20 defined by an upstanding neck flange 21 provided at its upper end with a lateral, annular overhanging flange 22. Initial charging of the tank with a suitable volume of the softening agent is accomplished through the access opening 20 and subsequently as required salt is introduced through the access opening 20 for regeneration purposes.

To seal the access opening 20 for maintaining water pressure within the tank 10, a novel self-sealing closure device 23 is provided. This includes an adapter or seating member 24 preferably in the form of a generally ring-shaped plate adapted to overlie the tank mouth flange 22 and of substantially larger diameter so that a downwardly extending marginal skirt flange 25 on the plate will encompass the edge of the flange 22 in spaced relation.

Attachment of the plate 24 may be effected by means of a plurality of screws 27 extending through appropriate screw holes 28 provided in the outer margin of the plate 24 just inside the skirt flange 25 and in preferably uniformly spaced relation so that the shanks of the screws will extend down in the space between the flange 25 and the edge of the tank mouth flange 22 and close to the edge of the tank mouth flange. Through this arrangement, nuts 29 threaded onto the shanks of the screws 27 will engage under the lip of the flange 22 so that by tightening the screws the plate 24 will be tightened down against the top of the tank neck 21.

To facilitate tightening the screws 27, the lower portion of the skirt flange 25 is preferably provided with an annular recessed shoulder 30 of a diameter to receive flats on the nuts 20 to hold the nuts against turning while the screws are tightened by a tool such as a screwdriver applied to the heads of the screws 27 exposed at the top of the plate 24.

By preference, a gasket 31 of ring shape and made from any suitable rubber or rubber-like material is interposed between the underside of the plate 24 and the upper end of the neck 21 for water sealing purposes. To maintain the gasket centered with relation to the plate 24, the underside of the plate may be provided with an annular recessed groove 32.

For charging the tank with salt, the plate or cap member 24 is provided with an axial opening 33 of ample size to receive therethrough the nozzle of a funnel as customarily used for this purpose, and such opening is of smaller diameter than the access opening 20 in the tank so that a substantial inner marginal portion of the plate member 24 overlies the access opening. This provides a downwardly or inwardly facing seat for a closure disk 34 of larger diameter than the charging opening 33 but of smaller diameter than the inner diameter of the neck 21 so as to be freely movable toward and away from the seat provided by the inner margin of the cap plate 24. Pressure of the water within the tank acting on the under or inner side of the closure disk 34 drives the same against its seat. To assure a thorough water seal, the gasket 31 has its inner margin of a diameter to lie between the margin of the closure disk 34 and the seat provided by the cap plate 24. Since the water supply is generally under substantial pressure, being under a pressure of about 50 pounds per square inch in the usual city water systems, it will be appreciated that the closure disk 34 is effectively driven against its seat by the water pressure.

In order to secure the closure disk 34 in closing relation to the charging opening 33 preliminary to pressurizing the tank 10, an upstanding axial stem 35 is provided on the disk and having a threaded upper portion 37 upon which is threadedly engaged a thumb nut 38 whereby the stem is releasably attachable to a bridge member 39 removably positionable over the opening 33.

By preference the bridge member 39 is of generally half-dome shell construction having a lower edge engageable upon the upper face of the cap plate 24 about the margin defining the opening 33 and retained in proper alignment relative to the opening by a plurality of upstanding positioning lugs 40 provided for the purpose on the cap member 24 at one side of the opening as best seen in Figs. 2 and 3. The upper portion of the bridge member 39 extends beyond half way over the opening 39 and is provided with a central notch 41 receptive of the stem 35 so that the thumb nut 38 can be tightened down onto the top of the bridge member 39 for drawing the closure disk 34 up into closing position relative to the opening 33. Such positioning of the closure disk 34 in closing relation need not be effected with any degree of tightening of the nut 38 since all that is necessary is to hold the disk 34 in place until the water pressure acts thereon to drive it against its seat. Thereafter the nut 38 could even be loosened or removed without the closure disk 34 leaving its seat and maintaining a thorough water sealing relation to the cap plate member.

When it becomes desirable to deposit a charge of salt into the tank 10 for regeneration purposes, the water pressure in the tank is relieved, and the bridge member 39 is disengaged from the stem 35 and cleared from above the opening 33, and the closure disk 34 is allowed to drop down clear of the opening 33. By providing the disk 34 with a downwardly projecting stem 42 of a length sufficient to be at all times within the nipple 19, the disk 34 will be positively guided down onto the top of the nipple 19 where it comes to rest as indicated in dot-dash outline in Fig. 3 directly under the access opening 20. As the salt is poured through the opening 33, it drops onto the depressed disk 34 and runs uniformly off of the disk about its entire periphery into the tank. Through this arrangement, therefore, the disk 34 serves in its depressed position as a distributor for the salt. After the full charge of salt has been poured into the tank, any salt remaining on the disk 34 is flushed off and the disk can then be returned to the upper closing position by grasping the upwardly projecting stem 35 or the wing nut 38 or both as a handle, drawing the disk up into position and then replacing the bridge member 39 and screwing down the thumb nut 38.

By having the lower end or tip of the downwardly projecting stem 42 inside the mouth of the nipple 19 even in the closure position of the disk 34, any tendency for the disk to cant away from the nipple 19 when the disk is released from its closure position is avoided.

If preferred, the stem 35 and the stem 42 may actually comprise a single rod-like member extending through the center of the disk 34 which for this purpose may be provided with a hub 43 within which the rod is brazed or otherwise permanently fastened. If desired the disk 34 and the stem rod may be cast into an integral unit.

In the modification of Figs. 4 and 5, a closure assembly 45 similar to the closure assembly of Fig. 3 is provided but provision is made for accommodating a water softening tank system wherein there is no means for supporting the closure disk in its unseated position. In Figs. 4 and 5 primed reference numerals are used to designate elements substantially identical to the showing in Fig. 3 and it will be understood that the construction and relationship of such elements correspond to the description already given.

Instead of an intervening gasket clamped between the upper end of the neck 21' and the cap plate 24', a ring-shaped gasket 47 may be provided which is secured in any suitable manner as by an appropriate adhesive within the reentrant corner provided between the neck 21' and the plate 24' while the plate is secured directly onto the end of the neck. It has been found that the gasket 47 can be secured to either the upper inside margin of the neck 21 or to the underside of the cap plate 24' and that the pressure of the disk 34' under service in sealing relation against the gasket 47 presses the unsecured surface of the gasket under compression against the contiguous opposing surface of the neck or the cap plate, as the case may be, with sufficient force to effect a thorough water-tight seal.

In order to support the closure disk 34' in its open or unseated position, a connecting member of preferably flexible nature such as a chain 48 is provided for connecting the upper end of the stem 35' to the removable bridge member 39'. For this purpose the upper end of the stem 35' may be provided with a transverse hole 49 within which one terminal link of the chain 48 is connected. The opposite terminal link of the chain is secured to an integral eye 50 suitably provided on the bridge member 39'.

When the closure member 34' is in the open position, it is suspended below the cap plate 24' by the chain 48, and the bridge member 39' may rest upon the top of the tank 10' and abutting the skirt flange 25' substantially as shown in Fig. 4. At the same time, the chain 48 is accommodated within a clearance notch 51 in the inner edge of the cap plate 24' defining the opening 33' so as to avoid interference with proper centered seating of a funnel member F.

After the charging operation has been completed, the disk member 34' is pulled up by means of the chain 48 and the stem 35' into engagement with the gasket 47, the bridge member 39' is replaced to receive the stem 35' in the notch 41' and the thumb nut 38' is then turned down to hold the closure disk in closure position until the pressure builds up in the tank to force the closure disk sealingly against the gasket 47.

In the modification of Fig. 6, a structure is provided that is especially adapted for incorporation in tanks as original equipment. In this arrangement, a tank 60 having an upstanding annular flange neck 61 defining an access opening 62 is provided with internal threads 63 in the upper portion of the neck flange 61. Such threads accommodate an externally threaded ring shaped flange plate member 64 which is screwed down into the neck flange 61 to provide a restriction providing a seat for a closure disk of the kind described in connection with Figs. 3 and 4 for closing a charging opening 65 in the ring plate. A ring-shaped gasket 67 on the underside of the ring plate 64 and engaging against the adjacent inner wall of the neck flange 61 defining the opening 62 seals the joint between the closure disk and also the joint between the neck flange 61 and the ring plate 64 when the closure disk is placed under the compressive force of the water pressure in the tank. In this form of the invention either the disk and disk retainer arrangement of Fig. 3 or the disk and retainer arrangement of Fig. 4 may be employed, depending upon the type of system employed in the softener.

The closure structure of the present invention is susceptible of low cost manufacture from non-corroding materials. Thus, the cap plates or rings 24, 24' and 64 are adapted to be made as castings from non-corroding ferrous or non-ferrous materials or alloys as are also the bridge members 39 and 39' and the closure plates 34 and 34'. The stem portions 35 and 35' and 42 are economically made from standard non-corroding or corrosive-resistant material that can be obtained in rod form and then cut to appropriate length and assembled with the closure disk. Similarly such incidental parts as the thumb nut, the attaching screws or the chain 48 can be provided inexpensively in non-corroding and corrosive-resistant materials. Very little machining is required to prepare the assembly for use.

It will be understood that modifications and variations may be effected without departing from the scope of the novel concepts of the present invention.

I claim as my invention:

1. In combination in a water softener tank construction, a tank having an upwardly extending neck flange defining an access opening into the tank, a closure disk member of smaller diameter than said opening, a shoulder member carried in attached relation by the upper portion of said neck and having a joint therewith liable to leakage, said shoulder member providing a charging opening of smaller diameter than said access opening, said charging opening being of smaller diameter than said disk, and means for supporting said disk in closing relation at the inner face of said shoulder member to be forced by pressure within the tank into seating relation to said shoulder member, said shoulder member having a sealing gasket on its inner face against which said disk engages sealingly, said gasket also engaging said neck and thereby effecting a seal at the joint between said neck and said shoulder member.

2. In combination in a tank closure of the character described, a closure member having an opening therethrough and providing a shoulder about said opening directed toward the inside of an associated tank, a closure disk engageable with said shoulder and responsive to tank pressure to drive against said shoulder, a half-dome shaped shell bridge member having a lower seating edge engageable movably with the outer side of said closure member and a free upwardly arched and laterally directed edge with a notch recessed therein at its top portion, and a stem extending from said disk member and engageable in said notch when the bridge member is mounted on the outer side of said shoulder member over said opening, said stem having means thereon engageable with said bridge member to retain the stem in said notch and retain the disk member in closing relation to the opening, said shoulder member having lugs adjacent to said opening on the outer face of the shoulder member for engagement by the lower margin of said bridge member adjacent to said resting edge to position the bridge member properly with respect to said stem.

3. In combination in a tank closure of the character described, a cap plate member having a filler opening therethrough, a skirt flange on said cap plate member, a plurality of screw openings in said cap plate member inside and adjacent to said skirt flange, said skirt flange having an internal annular shoulder of larger diameter than the diameter of a circle about said screw openings and adapted to engage with flats on nuts of screws extending through said screw openings to hold the nuts against turning while the screws are drawn up.

4. In combination in a tank closure, a neck flange defining an access opening, said neck flange having a lateral outwardly projecting terminal flange, a cap plate member having an opening therethrough of smaller diameter than said access opening and seated on said neck and being of larger diameter than said terminal flange, said cap disk having a skirt flange extending about said lateral flange in spaced relation, attachment screws extending through said cap plate into the space between said skirt flange and said terminal flange and having nuts thereon engaging said terminal flange retainingly, said skirt flange having a shoulder engaging flats on the nuts to hold the nuts against turning while the screws are drawn up.

5. In a water softener tank, a tank body having an upwardly directed access opening defined by an inwardly facing annular shoulder, a pressure responsive self-sealing closure disk engageable with said shoulder, a water inlet pipe spaced inwardly within said tank from said opening but concentric with the opening, said pipe having an end directed toward the opening, said closure disk having a stem projecting inwardly therefrom and having its inner end portion within said pipe to guide the stem and thereby the disk in movement from the closed position toward open position of the disk, said pipe end providing a seat for supporting the disk in open position spaced from said opening so that in the open position the disk provides a distributing flange baffle opposing the opening for baffling salt poured through said opening uniformly about the disk and said pipe into the tank.

6. In a water softener tank construction, a tank body having an upwardly directed access opening defined by an inwardly facing annular shoulder, a pressure responsive self-sealing closure disk located inwardly relative to said shoulder and dimensioned to be engageable with said shoulder, said disk having a downwardly directed central stem of substantial length, an upwardly opening water pipe located fixedly a substantial distance below and concentric with said opening, said stem being in guided relation within said pipe and being freely movable in the absence of internal pressure within the tank from sealing engagement with said shoulder into seating engagement upon said pipe substantially clear of the tank body below said opening to serve as a baffle for salt or the like poured through said opening to distribute the same away from said pipe about the disk into the tank, and means on said disk engageable through said opening for drawing the disk away from said guide means into sealing relation to said shoulder when pressure is to be resumed within the tank.

7. In a tank closure construction, a neck flange defining an access opening, said neck flange having on its outer end a laterally projecting annular terminal flange, a cap plate member seated on said neck and being of larger diameter than said terminal flange to project laterally substantially annularly beyond the outer edge of said terminal flange, said cap plate having a central opening therethrough of smaller diameter than said access opening and providing an inwardly facing shoulder inside said terminal flange, a closure disk engageable against said shoulder for sealing said cap plate opening, and means carried by the portion of said cap plate projecting laterally beyond said terminal flange and extending therefrom past the edge of said terminal flange and engaging under the terminal flange to secure the cap plate member firmly against the terminal flange.

8. In combination in a water softener tank construction, a tank having an upwardly extending neck flange defining an access opening into the tank, a closure disk member of smaller diameter than said opening, a shoulder member carried in attached relation by the upper portion of said neck and having a joint therewith liable to leakage, said shoulder member providing a charging opening of smaller diameter than said access opening, said charging opening being of smaller diameter than said disk, means for supporting said disk in closing relation at the inner face of said shoulder member to be forced by pressure within the tank into seating relation to said shoulder member, and a sealing gasket interposed between said shoulder member and the upper portion of said neck to effect a liquid seal therebetween, said gasket projecting from the interposed relation into engagement with said shoulder member inwardly from the neck flange for effecting a seal between said closure disk member and said shoulder member in the closing relation of said disk member.

9. In combination in a water softener tank construction, a tank having an upwardly extending neck flange defining an access opening into the tank, a closure disk member of smaller diameter than said opening, a shoulder member carried in attached relation by the upper portion of said neck and having a joint therewith liable to leakage, said shoulder member providing a charging opening of smaller diameter than said access opening, said charging opening being of smaller diameter than said disk, means for supporting said disk in closing relation at the inner face of said shoulder member to be forced by pressure within the tank into seating relation to said shoulder member, said shoulder member engaging directly against the neck flange, and a sealing gasket engaging both the inner face of the shoulder member and the adjacent surface of the neck and being engageable under pressure by said disk member to provide a liquid seal between the disk member and the shoulder member and to be pressed under compressive pressure into tight sealing engagement with the neck flange.

10. In combination in a water softener tank construction, a tank having an upwardly extending neck flange defining an access opening into the tank, a closure disk member of smaller diameter than said opening, a shoulder member carried in attached relation by the upper portion of said neck and having a joint therewith liable to leakage, said shoulder member providing a charging opening of smaller diameter than said access opening, said charging opening being of smaller diameter than said disk, means for supporting said disk in closing relation at the inner face of said shoulder member to be forced by pressure within the tank into seating relation to said shoulder member, said shoulder member being threadedly secured within said neck flange, and a sealing gasket engaging the inner face of the shoulder member and the adjacent surface of the neck flange and being engageable under compressive force by the disk member to provide a seal against fluid leakage past the disk member and against fluid leakage through said joint.

11. In a tank structure, a member having an opening therein to the interior of the tank and providing about the opening a generally upwardly directed seat for a funnel to project in filling relation into the tank through the opening, said member having an inwardly facing shoulder about said opening, a disk closure engageable with said shoulder, a bridge device engageable on said member over said opening, and a chain connecting said bridge device and said closure disk, said chain being of a length to support the disk in unseated opening-clearing position while the bridge member is at the same time disposed substantially to one side of the opening to clear the same for reception of the funnel, said disk and said bridge device having means thereon releasably interengageable to retain the disk in closing position, said member having a notch recessed in said seat and receptive of said chain when the disk is in open position, said notch being of a depth to clear the chain relative to said seat so that the funnel may seat uniformly on said seat during charging of the tank through the funnel.

References Cited in the file of this patent

UNITED STATES PATENTS

| | | |
|---|---|---|
| 382,610 | Holmes | May 8, 1888 |
| 706,693 | Schwerin | Aug. 12, 1902 |
| 999,613 | Weldon | Aug. 1, 1911 |
| 1,286,320 | Hood | Dec. 3, 1918 |
| 2,042,921 | Arvintz | June 2, 1936 |
| 2,371,241 | Jaffa | Mar. 13, 1945 |
| 2,411,505 | Chamberlain | Nov. 26, 1946 |
| 2,520,864 | Thornhill | Aug. 29, 1950 |